United States Patent Office 3,151,970
Patented Oct. 6, 1964

3,151,970
HERBICIDAL COMPOSITION AND METHOD
Gerald Bertram Lush and Edward Levi Leafe, both of Nottingham, England, assignors to Boots Pure Drug Company Limited
No Drawing. Filed Oct. 26, 1961, Ser. No. 147,743
Claims priority, application Great Britain, Nov. 7, 1960, 38,182/60
5 Claims. (Cl. 71—2.6)

This invention relates to weedkilling compositions and methods for the control of weeds. It further relates to certain new compounds which are of value as weedkillers.

It is well known that compositions which contain as active ingredients certain substituted phenoxyalkanoic acids or their functional derivatives may be used to control the growth of many common weeds in cereal crops. The best known and most widely used compositions of this type contain as active ingredient a substituted phenoxyacetic acid, for example 2,4-dichlorophenoxyacetic acid [2,4-D] and 4-chloro-2-methylphenoxyacetic acid [MCPA]. However two important weeds, namely cleavers (*Galium aparine*) and chickweed (*Stellaria media*), that are commonly prevalent in cereal crops are not significantly affected by these compositions. In addition, at application rates necessary for weed control, the substituted phenoxyacetic acids seriously damage leguminous forage crops such as clover and therefore may not be used to control weeds in this type of crop without risk of serious damage to it. In recent years this latter problem has been overcome to a limited extent by the introduction of compositions which contain as active ingredient a substituted gamma-phenoxybutyric acid, for example gamma-(4-chloro-2-methylphenoxy)butyric acid [MCPB] and gamma-(2,4-dichlorophenoxy)-butyric acid [2,4-DB]. By the use of these compounds, selective weed control in clover etc. or clover etc./cereal crops is possible. However, in common with the substituted phenoxyacetic acids mentioned above, the substituted gamma-phenoxybutyric acids do not significantly affect the growth of cleavers and chickweed. Recently there have been introduced compositions containing alpha-(4-chloro-2-methylphenoxy)propionic acid [CMPP] which can be used to control the growth of cleavers and chickweed and a wide range of other weeds in cereal crops. However these compositions seriously damage leguminous forage crops such as clover and accordingly cannot be used to control weeds in these crops.

It will thus be seen that, although it is possible to control selectively a wide spectrum of weeds in growing cereal crops by the use of certain substituted phenoxyalkanoic acids, the selective control of a wide spectrum of weeds in leguminous forage crops such as clover remains a problem. Control of chickweed and cleavers in clover etc., in particular, is impossible by means of known phenoxyalkanoic acid weedkillers; this is a serious disadvantage, especially in the case of chickweed, as this weed is extremely prevalent in leguminous forage crops such as clover, and its vigorous, mat-like growth tends to smother the seedling forage crops.

It is an object of this invention to provide compositions and processes for the selective control of weeds, including cleavers and chickweed, in leguminous forage crops such as clover, either direct-sown or undersown in cereal crops.

The present invention is based on our discovery that salts of a particular phenoxyalkanoic acid, namely alpha-(o-methylphenoxy)propionic acid [which may be referred to for convenience as MPP], which hitherto have never been suggested for use as weedkillers, possess properties which are both novel and unexpected. We have found that, if applied at selected rates to the plants at a suitable stage in their growth, salts of MPP do not significantly damage leguminous forage crops such as clover, whereas such application results in the death of or serious damage to cleavers, chickweed and many other weeds, for example, fat hen (*Chenopodium album*) and charlock (*Sinapis arvensis*). We have also found that salts of MPP do not damage cereal crops when they are applied at the stages of growth usual for hormone weedkillers. It will thus be apparent that the salts of MPP offer a means of selectively controlling weeds, in particular cleavers and the important chickweed, in leguminous forage crops such as clover, which may be direct-sown or undersown in cereal crops. The fact that derivatives of this particular phenoxypropionic acid may be used to obtain these very desirable results could not be predicted from the prior art. The unique position held by salts of MPP among the well-known phenoxyalkanoic acid weedkillers is clearly shown in the following Table I, which shows the effect of such compounds against cereals, chickweed, cleavers and clover.

TABLE I

| Compound | Cleavers | Chickweed | Clover | Cereals |
|---|---|---|---|---|
| MCPA | Resistant | Resistant | Toxic | Safe. |
| 2,4-D | do | do | do | Do. |
| 2,4,5-T | do | do | do | Do. |
| CMPP | Susceptible | Susceptible | do | Do. |
| 2,4-DP | do | do | do | Do. |
| 2,4,5-TP | do | do | do | Toxic. |
| MCPB | Resistant | Resistant | Safe | Safe. |
| 2,4-DB | do | do | do | Do. |
| MPP | Susceptible | Susceptible | do | Do. |

[2,4,5-T: 2,4,5-trichlorophenoxyacetic acid
2,4,5-TP: alpha-(2,4,5-trichlorophenoxy)propionic acid
2,4-DP: alpha-(2,4-dichlorophenoxy)propionic acid]

A study of the structure of the phenoxyalkanoic acids which are used commercially as selective weedkillers reveals that all of them possess a chlorine substituent in the 4-position of the phenyl nucleus. In fact it has been thought that such a 4-chloro substitutent was essential in a phenoxyalkanoic acid if high weedkilling efficiency was to be obtained. It is therefore surprising to find that salts of a phenoxyalkanoic acid not possessing a 4-chloro substituent in the phenyl nucleus, viz. alpha-(o-methylphenoxy)propionic acid, exhibit the valuable selective weedkilling properties hereindescribed. The unexpectedness of finding such activity is further illustrated when the negligible herbicidal activity of salts of o-methylphenoxyacetic acid and the complete lack of herbicidal activity of salts of gamma-(o-methylphenoxy) butyric acid are considered.

According to one aspect of the present invention there are provided compositions for the control of weeds in leguminous forage crops, which compositions comprise a salt of alpha-(o-methylphenoxy)propionic acid in association with a conventional weedkiller adjuvant, the concentration of said salt being at least 0.1%, calculated as free acid. The term "conventional weedkiller adjuvant" is to be interpreted as meaning any diluent or carrier which is commonly used in the art for extending a weedkilling substance in order to provide either a composition suitable for supplying to the user and requiring dilution before use or a composition suitable for use.

Salts of MPP which may be used in the compositions of the invention include salts with inorganic or organic bases such as the alkali metal and alkaline earth metal salts, the ammonium salt, and salts formed with primary, secondary and tertiary alkyl- or hydroxyalkylamines. Typical examples are the sodium, potassium, magnesium, diethanolamine, triethanolamine, monoethanolamine, diethylamine and ethylamine salts. Because of the ease of formulation and application by means of conventional spraying equipment, salts with high water-solubility are the preferred active ingredients of the compositions of the invention, in particular the sodium and potassium salts, which are the cheapest salts.

It is customary to market compositions of weedkillers in highly concentrated forms and to instruct the user to dilute the compositions with a suitable quantity of water before application to growing crops; the compositions of the invention include both the concentrated and diluted forms.

The preferred concentrated compositions of the invention are aqueous solutions of water-soluble salts of MPP, such as those salts hereinbefore described. The concentration of the salts in such solutions should obviously be as high as possible in order to minimise transport and storage costs. The upper limit is, of course, governed by the solubility of the particular salt. However, in general, a concentration of 10–80%, calculated as free acid, is desirable. A concentration of at least 30%, calculated as free acid, is preferable.

Less preferred compositions suitable for use with salts of MPP of low water solubility comprise conventional dispersible powders and concentrated suspensions. A dispersible powder comprises the active ingredient in association with a dispersing agent, and if desired, a solid inert diluent for example kaolin, such that an aqueous dispersion is formed on dulution with water. A concentrated suspension comprises the active ingredient milled to a paste with water and a dispersing agent. A concentration of 10–80%, calculated as free acid, is preferable.

The compositions of the invention include solid formulations. Thus a dust comprises a salt of MPP in association with a solid, pulverulent diluent which may be an inert diluent such as kaolin or a standard agricultural fertiliser. Granules may be produced by granulating the dust formulations by methods well-known in the art.

The concentration of a salt of MPP in the compositions intended for application to the plants is dependent on the type of machine which is used in applying the compositions, as both "low volume" and "high volume" sprayers are commonly used, requiring compositions containing different concentrations of active ingredient. These concentrations depend on the amount of active ingredient required to be applied to the plants per unit area in order to obtain the desired weed control. We have found that a salt of MPP should be applied at about 1–5 lbs./acre, calculated as free acid, about 2.5 lbs./acre being the preferred rate for adequate control of cleavers and chickweed in particular. Accordingly when used as an aqueous spray at the conventional rates of 5–100 gallons/acre, preferably 20 gallons per acre, the compositions will contain 0.1–10%, preferably 1.25%, of a salt of MPP calculated as free acid. In the case of solid compositions such as dusts and granules which are conventionally applied at 5–50 lbs./acre, the compositions will contain 2–80%, preferably 5–50%, of a salt of MPP, calculated as free acid.

The stage of growth of the crop at the time of treatment is important. Thus for example, in order to avoid significant damage to clover, it is necessary that it is not treated with the compositions of the invention before the first trifoliate leaf stage. If the clover is undersown in cereals, the cereals, if spring sown, must be between the one to two leaf stage and the jointing stage, and if winter sown, must be between the well-tillered stage and the jointing stage.

The hereinbefore described unexpected properties of salts of MPP may be further utilised in compositions which comprise a salt of MPP in combination with a second weedkilling substance, and such compositions form an additional feature of the invention. In particular it is possible to achieve beneficial results by combining in one composition a salt of MPP and a salt of a second phenoxyalkanoic acid, for example, MCPA, 2,4-D, MCPB, 2,4-DB, etc. In order to ensure a weedkilling composition possessing a completely adequate weed control spectrum under varying field conditions, the use of such combinations is frequently desirable. By combining small amounts of a salt of MCPA or 2,4-D (preferred because of high activity and low cost) with a salt of MPP, we have found that it is possible to obtain a considerable enhancement of weedkilling efficiency without producing a product with undesirable phytotoxicity towards the leguminous forage crops such as clover. The salt of MCPA or 2,4-D assists the action of the salt of MPP without noticeable damage to the crop.

When a salt of a phenoxyalkanoic acid is the second weedkilling substance, it should be present in the composition in an amount such that when the composition is applied at the rate necessary for the MPP component, 1–32 oz. of phenoxyalkanoic acid is applied per acre. That is to say the compositions may contain a ratio of salts of MPP and the second phenoxyalkanoic acid weedkiller, calculated in terms of the weights of free acids, of 0.5:1 to 80:1. The choice of ratio between these limits depends on the particular phenoxyalkanoic acid used. Thus in the case of salts of MCPA or 2,4-D, the application rate should be 1–10 oz. per acre, preferably 2–4 oz., calculated as free acid, so that the ratio MPP:MCPA or 2,4-D will be 1.6:1 to 80:1, preferably 10:1 to 20:1. In the case of salts of MCPB or 2,4-DB, higher rates are necessary in view of the known reduced activity of these compounds compared with the phenoxyacetic acid salts. Salts of more than one phenoxyalkanoic acid may be associated with the salts of MPP if desired.

The compositions of the invention may contain a salt of 4-chloro- or 4-bromo-2-oxobenzothiazolin-3-ylacetic acid. These compounds are described and claimed in our British patent specification number 862,226, and are extremely herbicidal. Their high activity against redshank (*Polygonum persicaria*) is noteworthy and their inclusion in compositions of the invention may be desirable if a product with high redshank activity is desired. Sufficient should be included to give application rates of 0.1–1 lb. acid equivalent per acre, 0.25–0.5 lb./acre being preferable. That is, the ratio of salt of MPP to salt of an aforementioned benzothiazole compound, based on free acids, may be 1:1 to 50:1, preferably 10:1 to 25:1.

It will be appreciated that some of the aforementioned compounds suggested for inclusion in the compositions of the invention cause damage to clover and like leguminous forage crops when they are applied at the rates normally used for weed control. However in the compositions of the invention they are present in such quantities that when the compositions are applied to clover etc. at rates necessary to utilise the activity of the salts of MPP, their application rates are below that which causes damage to the clover etc.

Salts of MPP have not previously been described and accordingly as a further feature of the invention, these salts are provided as new compounds. In particular there are provided the alkali metal and alkaline earth metal salts, for example sodium, potassium, calcium, magnesium etc., the ammonium salt, and salts with a primary, secondary or tertiary alkyl- or hydroxyalkylamine, for example diethanolamine, monoethanolamine, triethanolamine, diethylamine, ethylamine, etc. These new salts are prepared by the normal procedures for the preparation of salts. Thus reaction of MPP with the appropriate quantity of base, for example sodium or potassium hydroxides or carbonates, in aqueous medium, followed by crystallisation gives the desired salt.

According to a further feature of the invention there is provided a method of controlling weeds in a leguminous forage crop which method comprises applying to the weed infested crop a salt of alpha-(o-methylphenoxy)propionic acid at a dosage exerting a phytotoxic action against the weeds but substantially non-phytotoxic to the crop.

The following non-limitative examples illustrate the invention.

Example 1

Concentrated compositions containing the active ingredients as salts were prepared containing the following:

Percent, W./v.

(a) Alpha-(o-methylphenoxy)propionic acid ____ 48
    4-chloro-2-methylphenoxyacetic acid _____ 4
    Caustic soda, 100° Tw., q.s.
    Water to 100% vol.

(b) Alpha-(o-methylphenoxy)propionic acid ____ 48
    4-chloro-2-methylphenoxyacetic acid _____ 4
    4-chloro-2-oxobenzothiazolin-3-ylacetic acid __ 0.25
    Caustic soda, 100° Tw., q.s.
    Water to 100% vol.

(c) Alpha-(o-methylphenoxy)propionic acid ____ 48
    Caustic soda, 100° Tw., q.s.
    Water to 100% vol.

(d) Alpha-(o-methylphenoxy)propionic acid ____ 48
    Potassium hydroxide, 100° Tw., q.s.
    Water to 100% vol.

(e) Alpha-(o-methylphenoxy)propionic acid ____ 48
    2,4-dichlorophenoxyacetic acid _____ 4
    Diethanolamine, q.s.
    Water to 100% vol.

(f) Alpha-(o-methylphenoxy)propionic acid ____ 10
    4-chloro-2-methylphenoxyacetic acid _____ 0.5
    Potassium hydroxide, q.s.
    Water to 100% vol.

(g) Alpha-(o-methylphenoxy)propionic acid ____ 36
    Diethylamine, q.s.
    Water to 100% vol.

(h) Alpha-(o-methylphenoxy)propionic acid ____ 24
    2,4-dichloroacetic acid _____ 2
    Potassium hydroxide, 100° Tw., q.s.
    Water to 100% vol.

(i) Alpha-(o-methylphenoxy)propionic acid ____ 48
    Diethanolamine, q.s.
    Water to 100% vol.

(j) Alpha-(o-methylphenoxy)propionic acid ____ 80
    Sodium hydroxide, q.s.
    Water to 100% vol.

Example 2

Salts of alpha-(o-methylphenoxy)propionic acid were prepared as follows:

*Sodium.*—The acid (18 grams) and sodium hydroxide (4 grams) were reacted in water (50 ml.), and the resulting solution evaporated to dryness. The resulting solid was broken up to give the crystalline sodium salt, M.P. 265–270° C.

*Potassium.*—Using potassium hydroxide (5.6 grams) in place of sodium hydroxide, the potassium salt was obtained, M.P. 211–213° C.

*Magnesium.*—The acid (18 grams), magnesium oxide (4 grams) and water (100 ml.) were heated with stirring until the pH approximated 8. After filtration, the liquid was evaporated to dryness to give the magnesium salt, M.P. 338–341° C. (with decomposition).

*Calcium.*—The acid (18 grams), calcium oxide (5.6 grams) and water (1 litre) were boiled, filtered hot and the pH of the mixture adjusted to ca. 7 by addition of acid in alcohol. The solution was evaporated to about 250 ml. and after keeping at room temperature overnight, the calcium salt was isolated by filtration, M.P. approximately 200° C. (indistinct).

*Ammonium.*—The acid (18 grams) in ether (200 ml.) were saturated with ammonia, and the resulting ammonium salt collected by filtration, M.P. 130–135° C. (indistinct).

*Diethylamine.*—The acid (18 grams) and diethylamine (7.3 grams) were reacted in dry ether (100 ml.). The salt was collected by filtration, M.P. 106–108° C. Recrystallisation from methylcyclohexane gave needles, M.P. 105–107° C. (Found: C, 66.5; H, 9.2. $C_{14}H_{23}NO_3$ requires C, 66.3; H, 9.1%.)

*Diethanolamine.*—The acid (15.4 grams) and diethanolamine (8.8 grams) were warmed on the steambath to obtain a clear liquid. Drying of this over phosphorus pentoxide in a vacuum dessicator gave the salt in the form of a viscous liquid, which failed to crystallise under these conditions.

*Monoethanolamine.*—The acid (18 grams) and monoethanolamine (6.1 grams) were warmed on the steambath to obtain a clear liquid, which on drying over phosphorus pentoxide gave the salt in the form of a viscous liquid, which failed to crystallise under these conditions.

Details of a screening test designed to assess the herbicidal effectiveness of compounds against a range of plants will now be given. Cleavers (*Galium aparine*), chickweed (*Stellaria media*), red clover (*Trifolium pratense*) and wheat (*Triticum aestivum*) were sprayed with an aqueous composition of the compound under test. Each compound was formulated as a water-soluble salt, usually the diethanolamine salt, at a concentration of 0.4% weight by volume based on the free acid, and the solution was applied at a rate equivalent to 100 gallons per acre. This was in effect a rate of 4 lbs. per acre, based on free acid. Each compound was applied to duplicated groups of plants of each spicies. The plants were examined at intervals for the appearance of symptoms characteristic of the herbicidal plant growth regulators and a final assessment was made one month after treatment. The responses elicited in the plants were estimated by careful visual examination and were graded as follows:

0—No effect
1—Doubtful, insignificant effect
2—Transistory, mild effect
3—Negligible damage
4—Significant damage
5—Severe damage
6—Killed A compound must cause severe damage (grade 5) or kill the weeds (grade 6) if it is to be of possible use for the economic control of cleavers and chickweed under field conditions), and must give no more than negligible damage (grade 3) to clover if it is to be of value for selective weed control in this crop. The results obtained using MPP and a number of closely related compounds are shown in Table II.

TABLE II

| Compound | Cleavers | Chickweed | Clover | Wheat |
|---|---|---|---|---|
| Phenoxyacetic Acids: | | | | |
| Unsubstituted | 0 | 0 | 0 | 0 |
| 2-Methyl- | 0 | 3 | 0 | 0 |
| 4-Chloro-2-methyl-[MCPA] | 2 | 3 | 5 | 0 |
| 2,4-Dichloro-[2,4-D] | 0 | 1 | 5 | 0 |
| 2,4,5-Trichloro-[2,4,5-T] | 0 | 4 | 6 | 0 |
| Alpha-Phenoxypropionic Acids: | | | | |
| Unsubstituted | 3 | 0 | 0 | 0 |
| 2-Methyl-[MPP] | 5 | 5 | 3 | 0 |
| 3-Methyl- | 0 | 3 | 0 | 0 |
| 4-Methyl- | 4 | 3 | 4 | 0 |
| 4-Chloro-2-methyl-[CMPP] | 6 | 6 | 6 | 0 |
| 3-Chloro-2-methyl- | 4 | 4 | 0 | 0 |
| 5-Chloro-2-methyl- | 0 | 2 | 0 | 0 |
| 6-Chloro-2-methyl- | 0 | 0 | 2 | 0 |
| 3,4-Dichloro-2-methyl- | 3 | 4 | 4 | 0 |
| 3,5-Dichloro-2-methyl- | 2 | 2 | 0 | 0 |
| 4,6-Dichloro-2-methyl- | 0 | 0 | 0 | 0 |
| 5,6-Dichloro-2-methyl- | 0 | 0 | 0 | 0 |
| 4,5-Dichloro-2-methyl- | 5 | 4 | 5 | 0 |
| 2-Chloro- | 6 | 4 | 4 | 0 |
| 3-Chloro- | 4 | 6 | 4 | 0 |
| 4-Chloro- | 6 | 5 | 4 | 0 |
| 2,4-Dichloro- | 6 | 6 | 6 | 0 |
| 3,4-Dichloro- | 5 | 6 | 4 | 0 |
| 2,4,5-Trichloro- | 6 | 6 | 6 | 2 |
| 3,4,5-Trichloro- | 4 | 4 | 4 | 0 |
| 2,3,6-Trichloro- | 0 | 0 | 3 | 0 |
| Gamma-Phenoxybutyric Acids: | | | | |
| 4-Chloro-2-methyl-[MCPB] | 0 | 2 | 2 | 0 |
| 2,4-Dichloro-[2,4-DB] | 0 | 3 | 3 | 0 |
| 2-Methyl- | 0 | 0 | 0 | 0 |

It will be seen that only MPP gave results indicative of a compound which could possibly be used to control cleavers and chickweed in leguminous forage crops such as clover. All the other compounds exhibited either insufficient herbicidal activity towards the weeds or excessive toxicity towards the clover; many showed both these undesirable characteristics.

The value of MPP was clearly illustrated in field trials, details of some of which are given as follows:

A. On May 3, 1960, winter-sown wheat infested with weeds including cleavers and chickweed was sprayed at 20 gallons per acre with an aqueous solution of the sodium salt of MPP such that the application rate of MPP was 2.4 lb./acre. The wheat was fully-tillered, the cleavers 5–8″ and the chickweed 4–8″ high and in bud. This treatment resulted in a satisfactory control of the cleavers and chickweed, with no damage to the wheat.

B. On May 23, 1960, a plot of barley at the 5–6 leaf stage was sprayed with an aqueous solution of the sodium salt of MPP at a rate of 2.4 lb. acid/acre. At this time weed infestation included fat hen (4–5 leaves), charlock (6 leaves), red shank (5–6 leaves) and hemp nettle (4 pairs of leaves). The treatment resulted in a partial control of the fat hen and charlock and some control of hemp nettle and redshank. A second plot was sprayed with a mixture of the sodium salts of MPP and MCPA such that the application rates were 2.4 lb. MPP/acre and 3.2 oz. MCPA/acre. This treatment results in an excellent control of the charlock and fat hen, and the control of hemp nettle was improved. Both treatments gave no damage to the barley.

C. On May 25, 1960, plots of 4–5 leaf stage barley infested with red-shank were sprayed with (1) MPP at 2.4 lb./acre and (2) a mixture of 2.4 lb. MPP/acre and 6.4 oz. MCPA/acre, as sodium salt solutions. Treatment (1) gave some control of redshank. Treatment (2) gave a much improved control of redshank, the improvement being greater than that to be expected from the addition of the 6.4 oz./acre of MCPA.

D. On June 7, 1960, plots of direct-sown mixtures of grass, red clover and white clover infested with fat hen were sprayed with aqueous sodium salt solutions of either MPP or MPP/MCPA mixtures. (For comparison purposes, MCPA alone was also used.) The clovers were at the first trifoliate leaf stage, the grass had 3–6 leaves and up to 2 tillers, and the fat hen was about 3 inches high with 6–10 leaves. Weed control was assessed on July 5 and August 17 by careful visual examination, and the degree of control recorded on an arbitrary scale, 0 for no control up to 5 for 100% control. In Table III below are shown the details of application rates and weed control obtained (average of several replicates).

TABLE III

| No. | MPP (lb./acre) | MCPA (lb./acre) | Weed Control | |
|---|---|---|---|---|
| | | | 1st Assessment | 2d Assessment |
| 1 | 1.6 | 0 | 1 | 2.5 |
| 2 | 1.6 | 0.1 | 2.5 | 5 |
| 3 | 1.6 | 0.2 | 2.5 | 3.5 |
| 4 | 1.6 | 0.3 | 3 | 5 |
| 5 | 1.6 | 0.4 | 3 | 5 |
| 6 | 0 | 0.1 | 1 | 1.5 |
| 7 | 0 | 0.2 | 1 | 1.5 |
| 8 | 0 | 0.3 | 1 | 2 |
| 9 | 0 | 0.4 | 2 | 3 |
| 10 | 2.4 | 0 | 3.5 | 4 |
| 11 | 2.4 | 0.1 | 3.5 | 4.5 |
| 12 | 2.4 | 0.2 | 3.5 | 4.5 |
| 13 | 2.4 | 0.3 | 3.5 | 5 |
| 14 | 2.4 | 0.4 | 3.5 | 4.5 |

It will be seen that treatments 2, 3, 4, 5, 10, 11, 12, 13 and 14 resulted in a satisfactory control of fat hen. A synergistic effect in MPP/MCPA mixtures is suggested, particularly at the lower application rate of MPP. The clovers and grass in all cases exhibited negligible damage.

E. Oats undersown with a mixture of red and white clover, fat hen, charlock, redshank, cleavers and chickweed were sprayed at the 4 leaf stage with an aqueous solution containing the potassium salts of MPP and MCPA, at 20 gallons/acre. At the time of spraying the clover had 2 trifoliate leaves, the fat hen, charlock and reshank were at the young plant stage, the chickweed was growing into a vigorous mat 3 inches in height, and the cleavers were several times branched with an average of 7–8 whirls of leaves per branch. Six different MPP/MCPA mixtures were used so as to provide the following acid equivalent application rates (a) 2.4 lbs. MPP+1.6 oz. MCPA
(b) 2.4 lbs. MPP+3.2 oz. MCPA
(c) 2.4 lbs. MPP+6.4 oz. MCPA
(d) 3.6 lbs. MPP+1.6 oz. MCPA
(e) 3.6 lbs. MPP+3.2 oz. MCPA
(f) 3.6 lbs. MPP+6.4 oz. MCPA Results of the spraying were assessed one month before harvesting. Treatments (b), (c), (e) and (f) gave the following results Oats—unaffected
Clover—negligible damage
Chickweed—totally eradicated
Cleavers—severely depressed
Charlock—almost completely eradicated
Fat hen—severely checked
Redshank—a useful control Treatments (a) and (d) gave similar but less effective results.

F. On May 30, 1961, plots of undersown oats were sprayed with (1) a mixture of 1.8 lb. MPP/acre and 2.4 oz. MCPA/acre, (2) a mixture of 2.4 lb. MPP/acre and 3.2 oz. MCPA/acre, and (3) a mixture of 3.6 lb. MPP/acre and 4.8 oz. MCPA/acre, as sodium salt solutions. At the time of treatment, the oats had 4–5 leaves and the clover 2–4 trifoliate leaves. Weed infestation included redshank, chickweed, charlock, mayweed and knotgrass. On August 17, assessment revealed no damage to the oats and clover. Complete control of chickweed and charlock was obtained in all treatments; a fair control of redshank, knotgrass and mayweed was also obtained, the control improving through treatments (1) to (3).

We claim:

1. A composition for the selective control of weeds in leguminous forage crops which composition comprises an herbicidally effective amount of a mixture of a water soluble salt of alpha-(o-methylphenoxy)propionic acid and a water soluble salt of a phenoxyacetic acid selected from the group consisting of 4-chloro-2-methylphenoxyacetic acid and 2,4-dichlorophenoxyacetic acid, said salts being selected from the group consisting of alkali metal, alkaline earth metal, the ammonium, primary lower alkylamine, secondary lower alkylamine, tertiary lower alkylamine, primary hydroxy lower alkylamine, secondary hydroxy lower alkylamine and tertiary hydroxy lower alkylamine salts, the ratio of alpha-(o-methylphenoxy)propionic acid salt and phenoxyacetic acid salt being from 1.6:1 to 80:1, calculated as free acids.

2. A composition for the selective control of weeds in leguminous forage crops which composition comprises an herbicidally effective amount of a mixture of a water soluble salt of alpha-(o-methylphenoxy)propionic acid and a water soluble salt of a phenoxyacetic acid selected from the group consisting of 4-chloro-2-methylphenoxyacetic acid and 2,4-dichlorophenoxyacetic acid, said salts being selected from the group consisting of alkali metal, alkaline earth metal, the ammonium, primary lower alkylamine, secondary lower alkylamine, tertiary lower alkylamine, primary hydroxy lower alkylamine, secondary hydroxy lower alkylamine and tertiary hydroxy lower alkylamine salts, the ratio of alpha-(o-methylphenoxy)propionic acid salt and phenoxyacetic acid salt being from 10:1 to 20:1, calculated as free acids.

3. A method of selectively controlling weeds in leguminous forage crops which comprises applying to the weed infested crop a mixture of a water soluble salt of alpha-(o-methylphenoxy)propionic acid and a water soluble salt of a second phenoxyalkanoic acid selected from the group consisting of 2,4-dichlorophenoxyacetic acid and 4-chloro-2-methylphenoxyacetic acid, said salts being selected from the group consisting of alkali metal, alkaline earth metal, the ammonium, primary lower alkylamine, secondary lower alkylamine, tertiary lower alkylamine, primary hydroxy lower alkylamine, secondary hydroxy lower alkylamine and tertiary hydroxy lower alkylamine salts, the relative proportions of said salts and the rate of application of said mixture being such that the salt of alpha-(o-methylphenoxy)propionic acid is applied at a dosage of 1–5 lb. per acre and the phenoxyacetic acid salt is applied at a dosage of 1–10 oz. per acre, both dosages being calculated as free acids.

4. A method of selectively controlling weeds in leguminous forage crops which comprises applying to the weed infested crop an aqueous solution containing the sodium salt of alpha-(o-methylphenoxy)propionic acid and the sodium salt of 4-chloro-2-methylphenoxyacetic acid, the relative proportions of said salts and the rate of application of said solution being such that the salt of alpha-(o-methylphenoxy)propionic acid is applied at a dosage of about 2.5 lb. per acre, and the phenoxyacetic acid salt is applied at a dosage of about 2–4 oz. per acre, both dosages being calculated as free acids.

5. A method according to claim 4 in which said leguminous forage crop comprises clover.

References Cited in the file of this patent
UNITED STATES PATENTS
3,036,908    Gunther  _____ May 29, 1962
FOREIGN PATENTS
873,218    Great Britain  _____ July 19, 1961
OTHER REFERENCES Synerholm et al.: "Contr. Boyce Thompson Institute," vol. 14, 1945, pages 91–103.